(12) United States Patent
Hidaka et al.

(10) Patent No.: US 8,361,375 B2
(45) Date of Patent: Jan. 29, 2013

(54) FORMING MOLD OR ELECTROFORMING MOTHER DIE HAVING RELEASE LAYER AND METHOD FOR MANUFACTURING THE SAME

(75) Inventors: Tomoya Hidaka, Ichihara (JP); Norifumi Nakamoto, Ichikawa (JP); Yoshitaka Fujita, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 13/344,210

(22) Filed: Jan. 5, 2012

(65) Prior Publication Data

US 2012/0126448 A1 May 24, 2012

Related U.S. Application Data

(63) Continuation of application No. 11/722,847, filed as application No. PCT/JP2005/024034 on Dec. 28, 2005, now abandoned.

(30) Foreign Application Priority Data

Dec. 28, 2004 (JP) ................................. 2004-381941
Apr. 19, 2005 (JP) ................................. 2005-121597

(51) Int. Cl.
*B28B 7/36* (2006.01)
*B28B 7/38* (2006.01)
(52) U.S. Cl. ......... 264/338; 427/133; 427/135; 427/387
(58) Field of Classification Search ........................ None
See application file for complete search history.

(56) References Cited

U.S. PATENT DOCUMENTS

| | | | |
|---|---|---|---|
| 4,534,928 | A | 8/1985 | Martin |
| 4,775,554 | A | 10/1988 | Ponjee |
| 5,284,707 | A | 2/1994 | Ogawa et al. |
| 5,316,716 | A | 5/1994 | Sato et al. |
| 5,635,246 | A | 6/1997 | Ogawa et al. |
| 5,772,905 | A | 6/1998 | Chou |
| 5,849,369 | A | 12/1998 | Ogawa |
| 6,235,833 | B1 | 5/2001 | Akamatsu et al. |
| 6,548,116 | B2 | 4/2003 | Ogawa |
| 2002/0190416 | A1 | 12/2002 | Birch et al. |

FOREIGN PATENT DOCUMENTS

| | | |
|---|---|---|
| EP | 0 773 093 A1 | 5/1997 |
| JP | A-62-236713 | 10/1987 |
| JP | A-63-149116 | 6/1988 |
| JP | A-04-132637 | 5/1992 |
| JP | A-4-221630 | 8/1992 |
| JP | A-4-364906 | 12/1992 |
| JP | A-4-367721 | 12/1992 |
| JP | A-5-339775 | 12/1993 |
| JP | A-8-337654 | 12/1996 |
| JP | A-9-208438 | 8/1997 |
| JP | A-11-228942 | 8/1999 |
| JP | A-11-322368 | 11/1999 |
| JP | A-2000-053421 | 2/2000 |
| JP | A-2000-129484 | 5/2000 |

OTHER PUBLICATIONS

Kojio et al., "Novel Method to Prepare Organosilane Monolayers on Solid Substrate," Bull. Chem. Soc. Jpn., vol. 74, pp. 1397-1401, 2001.
Kawasaki, "The Foundation and Applied Products Electroforming Technology," Surface Technique, vol. 52, No. 11, pp. 726-729, 2001 with partial English-language translation.
Feb. 28, 2006 International Search Report issued in International Application No. PCT/JP2005/024034.
Database WPI Week 198849, Thomson Scientific, London, GB; AN 1988-348490 XP002600412 & JP 63 149116 A, Jun. 21, 1988.
Sep. 24, 2010 Supplementary European Search Report issued in European Application No. 05844851.5.

*Primary Examiner* — Mary F Theisen
(74) *Attorney, Agent, or Firm* — Oliff & Berridge, PLC (57) ABSTRACT

A forming mold or electroforming mother die including a mold or mother die, and a release layer composed of an organic thin film on a mold surface or mother die surface which is formed by contacting the mold or mother die with an organic solvent solution including a silane surfactant represented by formula [1]

$$R_n\text{—Si—}X_{4-n} \quad [1]$$

where R represents an optionally substituted hydrocarbon group or halogenated hydrocarbon having 1 to 20 carbon atoms, or a hydrocarbon group or a halogenated hydrocarbon group having a linking group which has 1 to 20 carbon atoms, X represents a hydroxyl group, a halogen atom, an alkoxy group having 1 to 6 carbon atoms, or an acyloxy group, and n represents an integer of 1 to 3; and a catalyst capable of interacting with the silane surfactant, and a production method thereof.

11 Claims, 2 Drawing Sheets

FORMING MOLD OR ELECTROFORMING MOTHER DIE HAVING RELEASE LAYER AND METHOD FOR MANUFACTURING THE SAME

CROSS-REFERENCE TO PRIOR APPLICATIONS

This is a continuation of application Ser. No. 11/722,847 filed Jun. 26, 2007, which is a National Stage Application of PCT/JP2005/024034 filed Dec. 28, 2005, and claims the benefit of Japanese Patent Application Nos. 2004-381941 filed Dec. 28, 2004 and 2005-121597 filed Apr. 19, 2005. The entire disclosures of the prior applications are hereby incorporated by reference herein in their entirety.

TECHNICAL FIELD

The present invention relates to a forming mold or electroforming mother die, in which a release layer comprising an organic thin film is formed on a surface of a mold or a mother die, especially a forming mold for molding resin, and a method for manufacturing the same.

BACKGROUND OF THE INVENTION

A production method of a chemically adsorbed monolayer which has excellent peeling resistance ad high transparency and which does not impair the luster of the substrate surface or transparency of the substrate has been known in the prior art (for example, patent documents 1 to 3). However, the conventional production method of a chemically adsorbed monolayer had the problem of generating harmful chlorine gas during monolayer production since a coated film is formed by a hydrochloric acid elimination reacting between silane surfactant and active hydrogen on the substrate surface.

Methods for forming a monolayer by a dealcohol reaction of an alkoxysilane surfactant has been attempted. However, this method had the problem of the reaction rate of the dealcohol reaction being excessively slow, thereby preventing film formation from being carried out expediently.

In order to solve this problem, although a method for using a dealcohol catalyst is concerned, the addition of a dealcohol catalyst alone only ended up causing the surfactant to crosslink with itself due to moisture in the air, thereby inhibiting the reaction at the solid-liquid interface on the substrate surface, and making it difficult to efficiently form a chemically adsorbed film.

As a method for forming a chemical adsorption film on a substrate surface comprising an active hydrogen, a method for forming a chemically adsorbed film covalently bonded by means of siloxane bonds by contacting a mixed solution containing at least an alkoxysilane surfactant, a non-aqueous solvent free of active hydrogen, and a silanol condensation catalyst with a substrate surface was diclosed. Examples of the silanol condensation catalyst disclosed therein include at least one substance selected from the group consisting of a carboxylic acid metal salt, carboxylic acid ester metal salt, carboxylic acid metal salt polymer, carboxylic acid metal salt chelate, titanic acid ester, and titanic acid ester chelate (for example, patent document 4).

In addition, as an example of a method for forming a chemically adsorbed film having crystallinity on the surface of a substrate, a method in which an organic solvent solution of a silane surfactant is spread over the surface of a silicon wafer onto which has been dropped purified water to form a crystalline monolayer has been known (for example, non-patent document 1).

As method for forming a water repellent film, methods for immobilizing a water repellent film composed of a monolayer on a substrate surface via silanol groups using a monomer or polymer of a hydrolysis product of a fluoroalkyl group-containing silane compound hydrolyzed in the presence of an acid catalyst has been known (for example, patent documents 5 and 6).

On the other hand, as a method in which a hydrophilic, inorganic surface is treated under anhydrous conditions with a silane compound and a monolayer of the silane compound is chemically linked to the hydrophilic, inorganic surface via oxygen bridges to provide a release layer so as to render the hydrophilic, inorganic surface of a mold suitable for the release of synthetic resin products, a method in which the hydrophilic, inorganic surface is treated with the vapour of the silane compound at a reduced pressure or a method in which the hydrophilic, inorganic surface is treated with the solution dissolving silane compound in an organic solvent (for example, patent document 7), has been known.

Also, regarding an electroforming technique in which, by electrifying a metal and a mother die (base matter to obtain an objective shaped product) of an electrolytic material in a metal electrolysis solution, the metal is electrolyzed to be dissolved as a metal ion in the metal electrolysis solution and is electrodeposited on the mother die so as to obtain the target product, it is necessary to release the electrodeposited metal from the mother die and it is known that the quality of electroforming depends on the releasing of the electrodeposited metal from this mother die (for example, non-patent document 2).

[Patent document 1] Japanese Laid-Open Patent Application No. H4-132637
[Patent document 2] Japanese Laid-Open Patent Application No. H4-221630
[Patent document 3] Japanese Laid-Open Patent Application No. H4-367721
[Patent document 4] Japanese Laid-Open Patent Application No. H8-337654
[Patent document 5] Japanese Laid-Open Patent Application No. H11-228942
[Patent document 6] Japanese Laid-Open Patent Application No. H11-322368
[Patent document 7] Japanese Laid-Open Patent Application No. Sho62-236713
[Non-patent document 1] Bull. Chem. Soc. Jpn., 74, 1397-1401 (2001)
[Non-patent document 2] Surface technique Vol. 1.52, No. 11, 726-729 (2001)

SUMMARY OF THE INVENTION

An object of the present invention is to provide a forming mold or electroforming mother die, preferably a forming mold for molding resin, in which a release layer composed of an organic thin film having excellent abrasion resistance or release properties is formed on a surface of the forming mold or electroforming mother die and a method for manufacturing the same.

As a result of conducting extensive studies to solve the aforementioned problems, the inventors of the present invention found that a nickel mold in which a fine pattern of µm-order or less has been performed on the surface of the nickel mold is immersed in a toluene solution including n-octadecyltrimethoxysilane and a solution composed of titan tetraisopropoxide and n-octadecyltrimethoxysilane for 5 minutes, a release layer composed of an organic thin film having exellent abrasion resistance is formed by ultrasonic cleaning after immersing, the fine pattern of the surface of nickel mold having this release layer is transferred to acrylic resin, and the acrylic resin is released from the nickel mold for producing acryl light guide plate for a liquid crystal display panel obtaining excellent release properties, thereby leading to completion of the present invention.

Thus, the present invention relates to (1) a forming mold or electroforming mother die including a mold or mother die and a release layer composed of an organic thin film on a mold surface or mother die surface which is formed by contacting the mold or mother die with an organic solvent solution including a silane surfactant represented by the formula [1]

$$R_n\text{—}Si\text{—}X_{4-n} \quad [1]$$

(wherein, R represents an optionally substituted hydrocarbon group having 1 to 20 carbon atoms, an optionally substituted halogenated hydrocarbon group having 1 to 20 carbon atoms, a hydrocarbon group having a linking group which has 1 to 20 carbon atoms, or a halogenated hydrocarbon group having a linking group which has 1 to 20 carbon atoms, X represents a hydroxyl group, a halogen atom, an alkoxy group having 1 to 6 carbon atoms, or an acyloxy group, and n represents an integer of 1 to 3) and a catalyst capable of interacting with the silane surfactant.

Also, the present invention relates to (2) the forming mold or electroforming mother die in (1) above described, wherein the forming mold is a forming mold for molding resin, (3) the forming mold or electroforming mother die in (1) or (2) described above, wherein the silane surfactant represented by the formula [1] is n-octadecyltrimethoxysilane, (4) the forming mold or electroforming mother die in any one of (1) to (3) described above, wherein the catalyst capable of interacting with the silane surfactant is at least one type of compound selected from metal oxides; metal hydroxides; metal alkoxides; metal compounds chelated or coordinated; partial hydrolysis products of metal alkoxide; hydrolysis products obtained by treating a metal alkoxide with water in an amount 2 times or more the equivalent of the metal alkoxide; organic acids; silanol condensation catalysts; or acid catalysts, (5) the forming mold or electroforming mother die in any one of (1) to (3) described above, wherein the catalyst capable of interacting with the silane surfactant is a composition including (a) at least one type of compound selected from metal oxides; metal hydroxides; metal alkoxides; metal compounds chelated or coordinated; partial hydrolysis products of a metal alkoxide; hydrolysis products obtained by treating a metal alkoxide with water in an amount 2 times or more the equivalent of the metal alkoxide; organic acids; silanol condensation catalysts; or acid catalysts and (b) the silane surfactant, (6) the forming mold or electroforming mother die in (4) or (5) described above, wherein the metal alkoxide is a titanium alkoxide, (7) the forming mold or electroforming mother die in (6) described above, wherein the titanium alkoxide is titanium tetraisopropoxide, (8) the forming mold or electroforming mother die in any one of (1) to (7) described above, wherein the organic solvent solution is a hydrocarbon solvent solution, (9) the forming mold or electroforming mother die in (8) described above, wherein the hydrocarbon solvent solution is toluene, (10) the forming mold or electroforming mother die in any one of (1) to (9) described above, wherein the moisture content of the organic solvent solution is set or maintained within the range from 50 ppm to the saturated moisture content of the organic solvent, (11) the forming mold or electroforming mother die in any one of (1) to (10) described above, wherein the mold or mother die is made of nickel, stainless, or glass, (12) the forming mold or electroforming mother die in any one of (2) to (11) described above, wherein the resin is an acrylic resin, (13) the forming mold or electroforming mother die in any one of (1) to (12) described above, wherein the mold or mother die is contacted with the organic solvent solution by immersing the mold or mother die in the organic solvent solution, (14) the forming mold or electroforming mother die in (13) described above, wherein the mold or mother die is immersed for 5 minutes, and (15) the forming mold or electroforming mother die in any one of (1) to (14) described above, wherein an ultrasonic cleaning is performed after immersing.

Moreover, the present invention relates to (16) the forming mold or electroforming mother die in any one of (1) to (15) described above, wherein a fine pattern of µm-order or less is composed on the mold surface or mother die surface, (17) a method for manufacturing a forming mold or electroforming mother die including forming a release layer composed of an organic thin film on a mold surface or mother die surface by contacting the mold or mother die with an organic solvent solution including a silane surfactant represented by the formula [1]

$$R_n\text{—}Si\text{—}X_{4-n} \quad [1]$$

(wherein, R represents an optionally substituted hydrocarbon group having 1 to 20 carbon atoms, an optionally substituted halogenated hydrocarbon group having 1 to 20 carbon atoms, a hydrocarbon group having a linking group which has 1 to 20 carbon atoms, or a halogenated hydrocarbon group having a linking group which has 1 to 20 carbon atoms, X represents a hydroxyl group, a halogen atom, an alkoxy group having 1 to 6 carbon atoms, or an acyloxy group, and n represents an integer of 1 to 3) and a catalyst capable of interacting with the silane surfactant, (18) the method for manufacturing the forming mold or electroforming mother die in (17) described above, wherein the forming mold is a forming mold for molding resin, (19) the method for manufacturing the forming mold or electroforming mother die in (17) or (18) described above, wherein the silane surfactant represented by the formula [1] is n-octadecyltrimethoxysilane, and (20) the method for manufacturing the forming mold or electroforming mother die in any one of (17) to (19) described above, wherein the catalyst capable of interacting with the silane surfactant is at least one type of compound selected from metal oxides; metal hydroxides; metal alkoxides; metal compounds chelated or coordinated; partial hydrolysis products of a metal alkoxide; hydrolysis products obtained by treating a metal alkoxide with water in an amount 2 times or more the equivalent of the metal alkoxide; organic acids; silanol condensation catalysts; or acid catalysts.

In addition, the present invention relates to (21) the method for manufacturing the forming mold or electroforming mother die in any one of (17) to (19) described above, wherein the catalyst capable of interacting with the silane surfactant is a composition comprising (a) at least one type of compound selected from metal oxides; metal hydroxides; metal alkoxides; metal compounds chelated or coordinated; partial hydrolysis products of a metal alkoxide; hydrolysis products obtained by treating a metal alkoxide with water in an amount 2 times or more the equivalent of the metal alkoxide; organic acids; silanol condensation catalysts; or acid catalysts and (b) the silane surfactant, (22) the method for manufacturing the forming mold or electroforming mother die in (20) or (21) described above, wherein the metal alkoxide is titanium alkoxide, (23) the method for manufacturing the forming mold or electroforming mother die in (22) described above, wherein the titanium alkoxide is titanium tetraisopropoxide, (24) the method for manufacturing the forming mold or electroforming mother die in any one of (17) to (23) described above, wherein the organic solvent solution is a hydrocarbon solvent solution, (25) the method for manufacturing the forming mold or electroforming mother die in (24) described above, wherein the hydrocarbon solvent solution is toluene, (26) the method for manufacturing the forming mold or electroforming mother die in any one of (17) to (25) described above, wherein the moisture content of the solution for forming the release layer is set or maintained within the range from 50 ppm to the saturated moisture content of the organic solvent, (27) the method for manufacturing the forming mold or electroforming mother die in any one of (17) to (26) described above, wherein the mold or mother die is made of nickel, stainless, or glass, (28) the method for manufacturing the forming mold or electroforming mother die in any one of (18) to (27) described above, wherein the resin is an acrylic resin, (29) the method for manufacturing the forming mold or electroforming mother die in any one of (17) to (28) described above, wherein the mold or mother die is contacted with the organic solvent solution by immersing the mold or mother die in the organic solvent solution, (30) the method for manufacturing the forming mold or electroforming mother die in (29) described above, wherein the mold or mother die is immersed for 5 minutes, (31) the method for manufacturing the forming mold or electroforming mother die in any one of (17) to (30) described above, wherein an ultrasonic cleaning is performed after immersing, and (32) the method for manufacturing the forming mold or electroforming mother die in any one of (17) to (31) described above, wherein a fine pattern of μm-order or less is performed on the mold surface or mother die surface.

According to the present invention, a forming mold or mother die for electroforming, preferably a forming mold for molding resin, on which a release layer composed of an organic thin film having excellent abrasion resistance and releasing resistance is formed can be obtained. Also, because the formed release layer has great adhesion and crystallizability, it can be used for manufacturing devices such as liquid crystals, alignment layers, ELs, TFTs and can also be used for fine processing techniques such as nanoimprint techniques using nanomolds made of silica glass. Also, because the substrate surface is modified so as to be capable of being used for patterning, it can be used for manufacturing display devices such as metal wiring, color filters, PDPs, and SEDs.

DETAILED DESCRIPTION OF THE INVENTION

There are no particular limitations on a forming mold or electroforming mother die, provided that a release layer consisting of an organic thin film is formed on the surface of the mold or mother die by contacting the mold or mother die with an organic solvent solution including the silane surfactant represented by the aforementioned formula [1] and a catalyst capable of interacting with the silane surfactant. Also, there are no particular limitations on the method for manufacturing a forming mold or electroforming mother die, provided that the method includes forming a release layer consisting of an organic thin film on the surface of the mold or mother die by contacting the mold or mother die with an organic solvent solution including the silane surfactant represented by the aforementioned formula [1] and a catalyst capable of interacting with the silane surfactant. Preferable examples of the aforementioned forming mold or electroforming mother die include especially a forming mold for molding resin.

In the aforementioned formula [1], R represents an optionally substituted hydrocarbon group having 1 to 20 carbon atoms, an optionally substituted halogenated hydrocarbon group having 1 to 20 carbon atoms, a hydrocarbon group having a linking group which has 1 to 20 carbon atoms, or a halogenated hydrocarbon group having a linking group which has 1 to 20 carbon atoms.

Examples of the optionally substituted hydrocarbon group include alkyl groups having 1 to 20 carbon atoms such as a methyl group, an ethyl group, a n-propyl group, an isopropyl group, a n-butyl group, an isobutyl group, a sec-butyl group, a t-butyl group, a n-pentyl group, an isopentyl group, a neopentyl group, a t-pentyl group, a n-hexyl group, an isohexyl group, a n-heptyl group, a n-octyl group, a n-decyl group, or a n-octadecyl group; alkenyl groups having 2 to 20 carbon atoms such as a vinyl group, a propenyl group, a butenyl group, a pentenyl group, a n-decynyl group, or a n-octadecynyl group; and aryl groups such as a phenyl group or a naphthyl group. A hydrocarbon group having 8 to 20 carbon atoms is preferable.

Examples of the optionally substituted halogenated hydrocarbon group include halogenated alkyl groups having 1 to 20 carbon atoms, halogenated alkenyl groups having 2 to 20 carbon atoms, and halogenated aryl groups having 2 to 20 carbon atoms. Specific examples include groups in which at least one hydrogen atom in the aforementioned hydrocarbon group is substituted by a halogen atom such as a fluorine atom, a chlorine atom, or a bromine atom.

Examples of the optionally substituted hydrocarbon group or optionally substituted halogenated hydrocarbon group include carboxyl groups, amide groups, imide groups, ester groups, alkoxy groups such as a methoxy group or ethoxy group, and hydroxyl groups. The number of substituents thereof is preferably from 0 to 3.

Specific examples of the base hydrocarbon group of the hydrocarbon group having a linking group are the same as the examples of optionally substituted hydrocarbon groups.

In addition, specific examples of the base halogenated hydrocarbon group of the halogenated hydrocarbon group having a linking group are the same as the examples of optionally substituted halogenated hydrocarbon groups.

The linking group is preferably present between a carbon-carbon bond of the hydrocarbon group or halogenated hydrocarbon group, or between a carbon of a hydrocarbon group and a metal atom M to be described later. Specific examples of linking groups include —O—, —S—, —SO$_2$—, —CO—, —C(=O)O—, and the like.

X represents a hydroxyl group, a halogen atom, an alkoxy group having 1 to 6 carbon atoms, or an acyloxy group. Examples of the halogen atom include a fluorine atom, a chlorine atom, a bromine atom, an iodine atom, and the like. Examples of the alkoxy group having 1 to 6 carbon atoms include a methoxy group, an ethoxy group, a n-propoxy group, an isopropoxy group, a n-butoxy group, a sec-butoxy group, a t-butoxy group, a n-pentyloxy group, a n-hexyloxy group, and the like. Examples of the acyloxy group include an acetoxy group, a propionyloxy group, a n-propylcarbonyloxy group, an isopropylcarbonyloxy group, a n-buthylcarbonyloxy group, and the like. Among these, an alkoxy group having 1 to 6 carbon atoms is preferable and n is preferably 1.

Specific examples of the silane surfactant include (heptadecafluoro-1,1,2,2-tetrahydrodecyl)-1-triethoxysilane; (heptadecafluoro-1,1,2,2-tetrahydrodecyl)-1-trichlorosilane; (heptadecafluoro-1,1,2,2-tetrahydrodecyl)-1-dimethylchlorosilane; n-octadecyltrimethoxysilane; and the like. Among these, n-octadecyltrimethoxysilane is preferable.

There are no particular limitations on the catalyst capable of interacting with the silane surfactant provided that the catalyst compound has a function of promoting condensation by interacting with the silane parts or hydrolyzable group in the silane surfactant via a coordinate bond, a hydrogen bond, or the like, and activating the hydrolyzable group or hydroxyl group. It is preferable to use (A) at least one type of compound selected from metal oxides; metal hydroxides; metal alkoxides; metal compounds chelated or coordinated; partial hydrolysis products of metal alkoxide; hydrolysis products obtained by treating a metal alkoxide with water in an amount 2 times or more the equivalent of the metal alkoxide; organic acids; silanol condensation catalysts; or acid catalysts (hereinafter referred to as "catalyst component A"), or (B) (a) the catalyst component A and (b) a composition containing the silane surfactant (hereinafter to be referred to as "catalyst component B") is preferable. It is more preferable to use at least one type of metal alkoxide and partial hydrolysis product of a metal alkoxide.

Although there are no particular limitations on the metal alkoxide, a metal alkoxide of at least one type of metal selected from the group consisting of titanium, zirconium, aluminum, silicon, germanium, indium, tin, tantalum, zinc, tungsten, and lead is preferable for reasons such as being able to obtain an organic thin film having superior transparency. Among them, titanium alkoxide such as titanium tetraisopropoxide is preferable. Although there are no particular limitations on the number of carbon atoms of the alkoxy group of the metal alkoxide, 1 to 4 carbon atoms is more preferable in view of contained oxide concentration, ease of eliminating organic substances, ease of acquisition, and so forth.

Specific examples of metal alkoxides used in the present invention include silicon alkoxides such as $Si(OCH_3)_4$, $Si(OC_2H_5)_4$, $Si(OC_3H_7\text{-}i)_4$, and $Si(OC_4H_9\text{-}t_4)$; titanium alkoxides such as $Ti(OCH_3)_4$, $Ti(OC_2H_5)_4$, $Ti(OC_3H_7\text{-}i)_4$, and $Ti(OC_4H_9)_4$; tetraquis-trialkylsiloxytitaniums such as $Ti[OSi(CH_3)_3]_4$ and $Ti[OSi(C_2H_5)_3]_4$, zirconium alkoxides such as $Zr(OCH_3)_4$, $Zr(OC_2H_5)_4$, $Zr(OC_3H_7)_4$, and $Zr(OC_4H_9)_4$; aluminum alkoxides such as $Al(OCH_3)_4$, $Al(OC_2H_5)_4$, $Al(OC_3H_{74})_4$, and $Al(OC_4H_9)_3$; germanium alkoxides such as $Ge(OC_2H_5)_4$; indium alkoxides such as $In(OCH_3)_3$, $In(OC_2H_5)_3$, $In(OC_3H_7\text{-}i)_3$, and $In(OC_4H_9)_3$; tin alkoxides such as $Sn(OCH_3)_4$, $Sn(OC_2H_5)_4$, $Sn(OC_3H_7\text{-}i)_4$, and $Sn(OC_4H_9)_4$; tantalum alkoxides such as $Ta(OCH_3)_5$, $Ta(OC_2H_5)_5$, $Ta(OC_3H_7\text{-}i)_5$ and $Ta(OC_4H_9)_5$; tungsten alkoxides such as $W(OCH_3)_6$, $W(OC_2H_5)_6$, $W(OC_3H_7\text{-}i)_6$ and $W(OC_4H_9)_6$; zinc alkoxides such as $Zn(OC_2H_5)_2$; and lead alkoxides such as $Pb(OC_4H_9)_4$. These metal alkoxides can be used alone, or two or more types can be used in combination.

In addition, in the present invention, complex alkoxides obtained by reacting two or more types of metal alkoxides, complex alkoxides obtained by reacting one or more types of metal alkoxides and one or more types of metal salts, and combinations thereof can be used for the metal alkoxide.

Examples of complex alkoxides obtained by reacting two or more types of metal alkoxides include complex alkoxides obtained by reacting an alkoxide of an alkaline metal or alkaline earth metal with an alkoxide of a transition metal, and complex alkoxides obtained in the form of a complex salt by combining a group 3B element.

Specific examples include $BaTi(OR)_6$, $SrTi(OR)_6$, $BaZr(OR)_6$, $SrZr(OR)_6$, $LiNb(OR)_6$, $LiTa(OR)_6$, and combinations thereof, and reaction products, condensation products, and so forth of the aforementioned metal alkoxides and silicon alkoxides such as $LiVO(OR)_4$, $MgAl_2(OR)_8$, $(RO)_3SiOAl(OR')_2$, $(RO)_3SiOTi(OR)_3$, $(RO)_3SiOZOR)_3$, $(RO)_3SiOB(OR')_2$, $(RO)_3SiONb(OR')_4$, or $(RO)_3SiOTa(OR')_4$. Here, R and R' represent, for example, alkyl groups.

Examples of complex alkoxides obtained by reacting one or more types of metal alkoxides with one or more types of metal salts include compounds obtained by reacting a metal salt with a metal alkoxide.

Examples of metal salts include chlorides, nitrates, sulfates, acetates, formates, and succinates, while examples of the metal alkoxides include the same examples of metal alkoxides previously described.

A partial hydrolysis product of a metal alkoxide is obtained prior to a metal alkoxide being completely hydrolyzed, and is present in the state of an oligomer.

A preferable example of a method for producing a partial hydrolysis product of a metal alkoxide consists of using 0.5 to less than 2.0 times moles of water to the aforementioned examples of metal alkoxides, and hydrolyzing in an organic solvent within a temperature range from −100° C. to the reflux temperature of the aforementioned organic solvent.

Specific examples of such methods include:
(i) adding 0.5 to less than 1.0 times moles of water to a metal alkoxide in an organic solvent;
(ii) adding 1.0 to less than 2.0 times moles of water to a metal alkoxide in an organic solvent at a temperature equal to or lower than the temperature at which hydrolysis begins, preferably at 0° C. or lower, and more preferably within a range of −20 to −100° C., and
(iii) adding 0.5 to less than 2.0 times moles of water to a metal alkoxide at room temperature in an organic solvent while controlling the hydrolysis rate by, for example, a method for controlling the addition rate of the water, or a method using an aqueous solution in which the water concentration has been lowered by adding a water-soluble solvent to the water.

In the aforementioned method (i), after adding a predetermined amount of water at an arbitrary temperature, the reaction can be carried out by further adding water at a temperature equal to or lower than the temperature at which hydrolysis begins, and preferably at −20° C. or lower.

Although the reaction between metal alkoxide and water can be carried out by directly mixing the metal alkoxide and the water without using an organic solvent, the reaction is preferably carried out in an organic solvent. More specifically, although the reaction can be carried out using either a method in which water diluted with an organic solvent is added to an organic solvent solution of a metal alkoxide, or a method in which an metal alkoxide or organic solvent solution thereof is added to an organic solvent in which water has been suspended or dissolved, the former method in which water is added later is preferable.

Although there are no particular limitations on the concentration of the metal alkoxide in the organic solvent provided it inhibits violent generation of heat and has fluidity which allows stirring, it is normally within the range of 5 to 30% by weight.

Although there are no particular limitations on the reaction temperature between the metal alkoxide and the water in the aforementioned method (i), it is normally within the range of −100 to +100° C., and preferably within a temperature range from −20° C. to the boiling point of the organic solvent used or alcohol eliminated by hydrolysis.

Although there are no particular limitations on the addition temperature of the water in the aforementioned method (ii), provided it is dependent on the stability of the metal alkoxide and a temperature equal to or lower than the hydrolysis starting temperature or 0° C. or lower, depending on the type of metal alkoxide, the addition of water to the metal alkoxide is preferably carried out within a temperature range of −50 to −100° C. In addition, a dehydration/condensation reaction can also be carried out by hydrolyzing at a temperature from room temperature to the reflux temperature of the solvent used after having added water at a low temperature and heating for a fixed period of time.

The reaction between the metal alkoxide and the water in the aforementioned method (iii) can be carried out by controlling the rate of hydrolysis by a method other than that using temperature such as controlling the addition rate of the water within a temperature range which allows cooling without the use of a special cooling apparatus, such as a temperature within the range of 0° C. to room temperature. A dehydration/condensation reaction can be further carried out by hydrolyzing at a temperature from room temperature to the reflux temperature of the solvent used after heating for a fixed period of time.

An organic solvent which enables the hydrolysis product of the metal alkoxide to be dispersed in the form of a dispersoid in the organic solvent is preferable for the organic solvent used, and a solvent having high water solubility which does not coagulate at a low temperature is more preferable since the reaction for treating a silane surfactant with water can be carried out at a low temperature.

Specific examples of organic solvents used include alcohol solvents such as methanol, ethanol, or isopropanol; halogenated hydrocarbon solvents such as methylene chloride, chloroform, or chlorobenzene; hydrocarbon solvents such as hexane, cyclohexane, benzene, toluene, or xylene; ether solvents such as tetrahydrofuran, diethyl ether, or dioxane; ketone solvents such as acetone, methyl ethyl ketone, or methyl isobutyl ketone; amide solvents such as dimethylformamide or N-methylpyrrolidone; sulfoxide solvents such as dimethylsulfoxide; and silicones such as methylpolysiloxane, octamethylcyclotetrasiloxane, decamethylcyclopentanesiloxane, or methylphenylpolysiloxane (see, for example, Japanese Unexamined Patent Application, First Publication No. H9-208438).

These solvents can be used alone, or two or more types can be used after mixing.

In the case of using a mixed solvent, combinations of a hydrocarbon solvent such as toluene or xylene and a lower alcohol solvent such as methanol, ethanol, isopropanol, or t-butanol are preferable. Preferable examples of lower alcohol solvents in this case include secondary or higher lower alcohol solvents such as isopropanol or t-butanol. Although there are no particular limitations on the mixing ratio of the mixed solvent, the mixing ratio of the hydrocarbon solvent and lower alcohol solvent is preferably within the range of 99/1 to 50/50 by volume.

Although there are no particular limitations on the water used provided it is neutral, pure water, distilled water, or ion exchange water is used preferably from the viewpoint of few impurities and obtaining a fine organic thin film. The amount of water used is 0.5 to less than 2.0 times moles to 1 mole of the metal alkoxide.

In addition, an acid, base, or dispersion stabilizer may be added during the partial hydrolysis reaction of the metal alkoxide by water. There are no particular limitations on the acid or base provided it functions as a dispersing agent for redispersing coagulated precipitate; a catalyst for producing a dispersoid such as colloidal particles by hydrolyzing and dehydrating/condensing the metal alkoxide, or a dispersant for the dispersoid formed.

Examples of the acid used include a mineral acid such as hydrochloric acid, nitric acid, boric acid, or fluoroboric acid; an organic acid such as acetic acid, formic acid, oxalic acid, carbonic acid, trifluoroacetic acid, p-toluenesulfonic acid, or methanesulfonic acid; and photo acid generator which generates acid by being irradiated with light such as diphenyliodinium hexafluorophosphate or triphenylphosphonium hexafluorophosphate.

Examples of the base used include triethanol amine, triethyl amine, 1,8-diazabicyclo[5.4.0]-7-undecene, ammonia, dimethylformamide, and phosphine.

The dispersion stabilizers is an agent having the effect of stably dispersing a dispersoid in a dispersion medium, examples of which include dispersing agents, protective colloids, and anticoagulation agent such as surfactants. Specific examples include a multivalent carboxylic acid such as glycolic acid, gluconic acid, lactic acid, tartaric acid, citric acid, malic acid, or succinic acid; a hydroxycarboxylic acid; a phosphoric acid such as pyrophosphoric acid or tripolyphosphoric acid; a polydentate ligand compound having a strong chelating ability with respect to metal atoms such as acetyl acetone, methyl acetoacetic acid, ethyl acetoacetic acid, n-propyl acetoacetic acid, isopropyl acetoacetic acid, n-butyl acetoacetic acid, sec-butyl acetoacetic acid, t-butyl acetoacetic acid, 2,4-hexanedione, 2,4-heptanedione, 3,5-heptanedione, 2,4-octanedione, 2,4-nonanedione, or 5-methyl-hexanedione; a fatty acid amine, hydrostearic acid, or polyester amine such as Solsperse 3000, 9000, 17000, 20000, or 24000 (all of the above are products of Zeneca Corp.) or Disperbyk-161, -162, -163 or -164 (all of the above are products of BYK-Chemie Corp.); and a silicone compound such as a dimethylpolysiloxane-methyl (polysiloxyalkylene) siloxane copolymer, trimethylsiloxysilicic acid, a carboxy-modified silicone oil, or an amine-modified silicone (see, for example, Japanese Unexamined Patent Application, First Publication Nos. H9-208438 and 2000-53421).

The partial hydrolysis product obtained in the manner described above is in the form of a dispersoid having the property of stably dispersing without aggregating in an organic solvent and in the absence of an acid, a base and/or a dispersion stabilizer. In this case, a dispersoid refers to fine particles dispersed in a dispersion system, a specific example of which is colloidal particles.

Here, the state of stably dispersing without aggregating refers to the state in which a dispersoid of a hydrolysis product is not coagulate or non-uniformly separate in an organic solvent in the absence of an acid, a base and/or a dispersion stabilizer, and preferably refers to a transparent, uniform state.

In addition, transparent refers to the state of having high transmittance in visible light, and more specifically, refers to a state represented in terms of spectral transmittance as measured under conditions of a dispersoid concentration of 0.5% by weight as oxide, a quartz cell optical path length of 1 cm, the use of an organic solvent for the contrastive sample, and a light wavelength of 550 nm, and preferably refers to transmittance of 80 to 100%.

Although there are no particular limitations on the particle diameter of the dispersoid of the partial hydrolysis product, in order to obtain a high transmittance in visible light, it is normally 1 to 100 nm, preferably 1 to 50 nm, and more preferably 1 to 10 nm.

A catalyst component B capable of interacting with the silane surfactant can be obtained by mixing the catalyst component A and the silane surfactant. More specifically, the catalyst component B can be prepared by treating the silane surfactant with water in an organic solvent in the presence of the catalyst component A. The silane surfactant is preferably contained in the catalyst component B at 0.5 to 2.0 moles, and more preferably at 0.8 to 1.5 moles, to 1 mole of component A.

Specific examples of methods for treating the metal surfactant with water in an organic solvent in the presence of the catalyst component A include: (a) a method in which water is added to an organic solvent solution of the silane surfactant and the catalyst component A, and (b) a method in which the catalyst component A is added to an organic solvent solution of the silane surfactant and water. The catalyst component A is typically used in the state of an organic solvent containing water.

Preferable examples of organic solvent used to prepare the catalyst component B include hydrocarbon solvents, fluorocarbon solvents and silicone solvents, with those having a boiling point of 100 to 250° C. being used more preferably. Specific examples of the organic solvent include a hydrocarbon solvent such as n-hexane, cyclohexane, benzene, toluene, xylene, petroleum naphtha, solvent naphtha, petroleum ether, petroleum benzene, isoparaffin, normal paraffin, decalin, industrial gasoline, kerosene, or ligroin; a chlorofluorohydrocarbon solvent such as $CBr_2ClCF_3$, $CClF_2CF_2CCl_3$, $CClF_2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$, or $Cl(CF_2CFCl)_3Cl$; a fluorocarbon solvent such as fluorinate (3M) or Afrude (Asahi Glass); and a silicone solvent such as dimethyl silicone, phenyl silicone, alkyl-modified silicone, or polyether silicone. These solvents can be used alone or two or more types can be used in combination.

In addition, the water added in method (a) and the catalyst component A added in method (b) are preferably diluted with an organic solvent or the like to inhibit violent reactions.

A solution for forming a release layer can be obtained from the silane surfactant and the catalyst component A or the silane surfactant and the catalyst component B. More specifically, the solution for forming a release layer of the present invention can be obtained by stirring a mixture of the silane surfactant, an organic solvent, the catalyst component A and, as desired water, or a mixture of the silane surfactant, an organic solvent, the catalyst component B and, as desired water.

Although there are no particular limitations on the amount of the catalyst component A or catalyst component B used to prepare the solution for forming a release layer of the present invention, provided it does not effect the physical properties of the organic monolayer formed, it is normally 0.001 to 1 mole and preferably 0.001 to 0.2 moles to 1 mole of silane surfactant as the number of moles as an oxide.

Specific examples of methods for preparing the solution for forming a release layer of the present invention include: (a) a method in which water is added to an organic solvent solution of the catalyst component B and the silane surfactant, and (b) a method in which the catalyst component B is added to a mixed solution of the silane surfactant and water. In addition, the water added in method (a) and the catalyst component B added in method (b) are preferably diluted with an organic solvent in order to inhibit violent reaction.

Preferable examples of the organic solvent used to prepare the solution for forming a release layer of the present invention include hydrocarbon solvents, fluorocarbon solvents, and silicone solvents, with those having a boiling point of 100 to 250° C. being used particularly preferably. More specifically, the same hydrocarbon solvents, fluorocarbon solvents, and silicone solvents previously listed as examples able to be used to prepare catalyst component A or catalyst component B can be used.

The amount of water used to prepare the solution for forming a release layer of the present invention can be suitably determined according to the types of silane surfactant, catalyst component A, or catalyst component B used, substrate to be coated, and so forth. If the amount of water used is excessively large, the silane surfactants are subjected to condensation by each other and chemical adsorption to the substrate surface is inhibited, thereby resulting in the risk of a monolayer not being formed.

The stirring temperature of the mixture of the silane surfactant, the organic solvent, the catalyst component A or B, and water is normally 100 to +100° C. and preferably −20 to +50° C. The stirring time is normally from several minutes to several hours. In addition, an ultrasonic treatment is preferably carried out in this case to obtain a uniform solution for forming an organic thin film.

In the present invention, a solution in which the moisture content thereof has been adjusted or maintained to be within a predetermined range is preferably used for the solution for forming a release layer. The moisture content of the organic solvent solution is preferably an amount within a range which does not cause problems such as inhibition of chemical adsorption to the substrate surface, prevention of the production of a fine monolayer, loss of the amount of silane surfactant enabling effective use, or catalyst deactivation. In addition, in the case of contacting the solution with the substrate by dipping, a moisture content greater than that sufficient for promoting and activating the substrate surface or film formation is preferable for forming a fine, uniform organic thin film once and over the entire surface of the substrate contacted by the solution within a contact time of 10 minutes and preferably within 5 minutes.

More specifically, the moisture content of the solution for forming a release layer is preferably 50 ppm or more, and more preferably within the range from 50 ppm to the saturated moisture content of the organic solvent (and more specifically, within the range of 50 to 1000 ppm).

Examples of methods for adjusting or maintaining the moisture content of the solution for forming a release layer to be within a predetermined range include: (i) a method in which an aqueous layer is provided in contact with the solution for forming a release layer, (ii) a method in which the solution for forming a release layer is made to be present with a moisture-retaining substance while containing water, and (iii) a method in which a gas containing moisture is blown into the solution for forming a release layer.

Next, examples of methods for forming a release layer on the surface of a mold or mother die include a method for contacting a mold or mother die with a solution for forming release layer obtained by the aforementioned manner. Although examples of methods for contacting a mold or mother die include immersion, coating, spray, and the like, immersion is preferable. Depending on the kind of substrate, immersion time is preferably from 5 minutes to 24 hours, more preferably from 5 minutes to 10 hours. It is more preferable to carry out an ultrasonic cleaning using a hydrocarbon solvent solution after contacting by immersion or the like.

Preferable examples of the mold or mother die include a mold or mother die having a fine pattern of μm-order or less performed on the surface thereof. Although there are no particular limitations on the material of the mold or mother die, examples of the material include a metal such as nickel, stainless, aluminium, or copper; glass; ceramics; and the like. Nickel, stainless, or glass is preferable.

It is desirable that the surface of the mold or mother die is cleaned in advance before immersing in a solution for forming a release layer in order to form a finer and stronger release layer by removing impurities such as rubbish, dust, organic matter, or the like attached to the surface of the mold or mother die. There are no particular limitations to the cleaning method, provided that rubbish, dust, organic matter, or the like attached to the surface of the mold or mother die can be removed. Specific examples of the cleaning method include a chemical method for immersing in a solution of acid or alkali, or ozone water. In this method, the efficiency of cleaning is improved by carrying out ultrasonic treatment during immersion. Also, an example of the cleaning method includes a physical method for exposing to ultraviolet rays, ozone, or plasma.

Although these methods can be used alone, the effect is improved by using in combination.

It is preferable to heat the mold or mother die for stabilizing a release layer formed on the surface of the mold or mother die after forming a release layer or cleaning a release layer following forming. The heating temperature can be suitably determined according to stability or the like of the mold, mother die, or the formed organic thin film.

By contacting the mold or mother die with the solution for forming a release layer, the silane surfactant in the solution is adsorbed to the surface of the mold or mother die to form a release layer composed of a thin film. Although the detailed mechanism of adsorbing the silane surfactant to the surface of the mold or mother die is not obvious, the mechanism can be concerned as follows in the case of the mold or mother die having an active hydrogen on the surface. That is, the solution for forming a release layer is in a state where the hydrolysis group of the silane surfactant is hydrolysed by water.

The silane surfactant in this state reacts with an active hydrogen on the surface of the mold or mother die to form a thin film with a rigid chemical bond to the mold or mother die. This thin film is formed by reacting with an active hydrogen of the mold or mother die to be a monolayer. By using the solution for forming a release layer, a release layer composed of an organic thin film having oil-repellency and water-repellency before exposing to light or electrodepositing can be formed on the surface of the mold or mother die. More specifically, a release layer composed of an organic thin film having excellent abrasion resistance can be formed, in which the contact angle of water before exposing to light is preferably 80° or more, more preferably 85° or more, further preferably 90° or more, and especially preferably 100° or more, and the contact angle of toluene is 20° or more.

As the substrate when a forming a mold for molding resin, an acrylic resin substrate using an acrylic resin as the resin is preferable as the resin substrate. Also, although there are no particular limitations on the kind of metal for the electrolytic material in electroforming, material is used according to the advantage thereof, for example, nickel is used for the base of optical disk because of an advantage in spreadability, copper is used for the wiring because of an advantage in electrical conductivity, iron is used for the press die because of an advantage in hardness or heat resistance, gold is used for the wiring or decorating because of an advantage in corrosion resistance or suitability to noble metals, and silver is used for amplifier of DNA because of a bactericidal advantage.

Although there are no particular limitations on the electroforming solution used in electroforming, it is preferable to use an electroforming solution according to the kind of metal of the electrolytic material. Preferable examples include a bath of nickel sulfamate solution or nickel sulfate solution for nickle electroforming, a bath of copper cyanide solution, copper sulfate solution, or copper pyrophosphate solution for copper electroforming, a bath of iron sulfamate solution for iron electroforming, a bath of cobalt sulfamate solution or cobalt sulfate solution for cobalt electroforming, a bath of gold cyanide solution for gold electroforming, and a bath of silver pyrophosphate solution or silver cyanide solution for silver electroforming.

EXAMPLES

Although the following provides a more detailed explanation of the present invention through examples thereof, the present invention is not limited by the following examples.

Example 1

(1) Silane Surfactant

M-1: n-octadecyltrimethoxysilane (ODS) (manufacutured by Gelest, Inc.) was used as silane surfactant for preparing a solution for producing an organic thin film.

(2) Preparation of Catalyst-1

12.4 g of titanium tetraisopropoxide (trade name "A-1" manufacutured by Nippon Soda Co., Ltd: 99% purity, 28.2% concentration as titanium oxide) were dissolved in 45.0 g of toluene in a four-necked flask, and after replacing the inside of the flask with nitrogen gas, the solution was cooled to $-40°$ C. in a bath of denatured alcohol/dry ice. Separate from this procedure, after mixing 1.26 g of ion exchange water (molar ratio of $H_2O/Ti=1.6$) with 11.3 g of isopropanol, the mixture, which was cooled to $-40°$ C., was dropped into the four-neck flask while stirring. During dropping, the liquid temperature inside the flask was maintained at $-40°$ C. Following completion of dropping, the solution was stirred for 30 minutes while cooling followed by warming to room temperature to obtain a colorless, transparent partially hydrolyzed solution (T-1). The solid concentration of the solution was 5% by weight as titanium oxide.

An amount of the silane surfactant M-1 equivalent to a $TiO_2$:ODS ratio of 1:1 (molar ratio) was added to 20 g of this solution (T-1), and then diluted with an amount of toluene equivalent to 1% by weight as $TiO_2$. Next, 5 g of distilled water was added followed by stirring for 3 days at 40° C. and cooling to room temperature. The excess water which had separated into two phases was removed to obtain a transparent catalyst solution for forming the release layer (C-1). In addition, neither Ti or ODS was detected from the separated aqueous layer.

(3) Preparation of Solution for Forming Release Layer

The silane surfactant M-1 equivalent to a final concentration of 0.5% by weight was added to toluene having a moisture content of 450 ppm followed by stirring for 30 minutes at room temperature. Next, a catalyst solution for forming the release layer (C-1) equivalent to 1/10 times the moles (as TiO$_2$) of the silane surfactant M-1 was dropped in and stirred for 3 hours at room temperature following completion of dropping. Water was added to this solution so that the moisture content was 500 ppm to obtain a solution for forming a release layer (SA-1).

(4) Formation of Release Layer

A nickel mold to which ultrasonic cleaning and ozone cleaning has been performed was pulled up after being immersed in predetermined time and was then dried at 60° C. for 10 minutes after performing an ultrasonic cleaning with toluene for 10 seconds to form the organic thin film of M-1 (SAM-1).

Example 2

Figure 1:
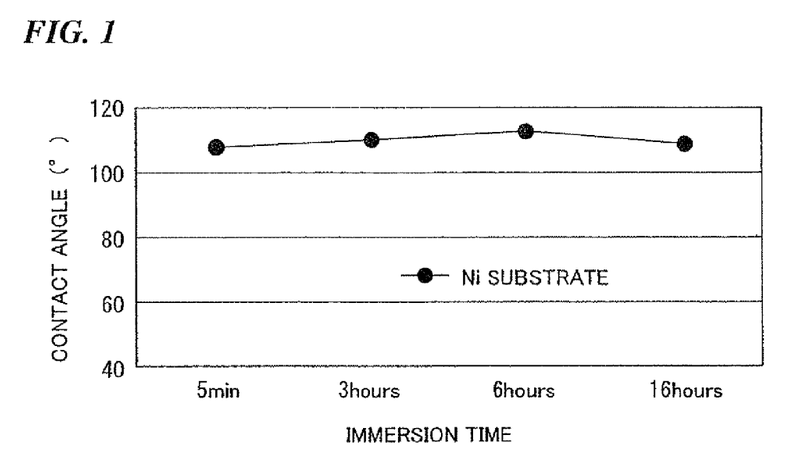
FIG. 1 is a graph showing the result of measuring the contact angle of the surface of the nickel mold on which a release layer of the present invention was formed after immersing for a predetermined time in a solution for forming a release layer.
Figure 2:
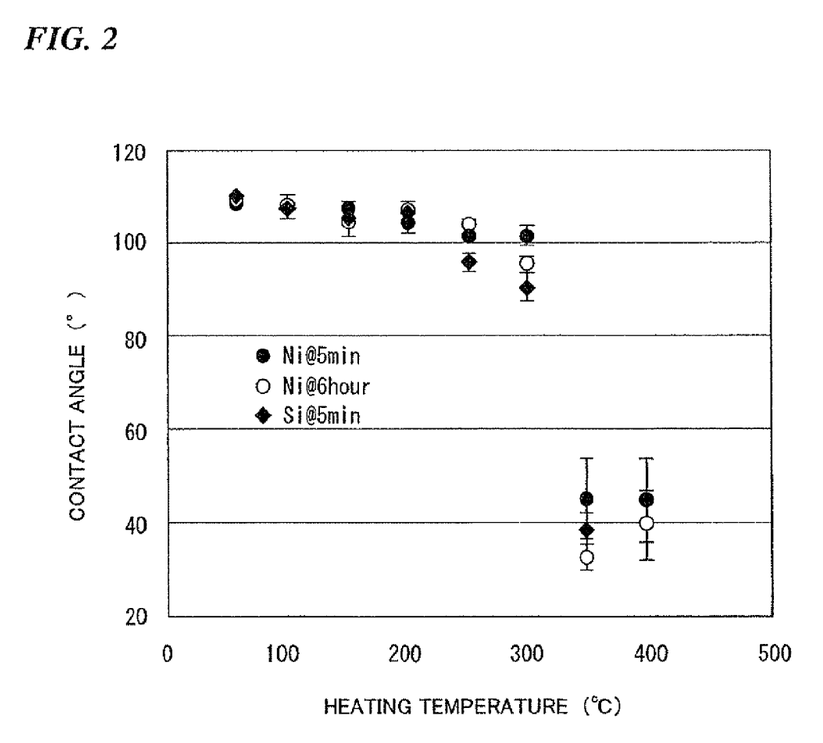
FIG. 2 is a graph showing the result of measuring the contact angle of the surface of the nickel mold and the surface of the silicone substrate on which a release layer of the present invention was formed after immersing for a predetermined time in a solution for forming a release layer and heating for a predetermined temperature.

The surface observation and physical evaluation of the thin film on the nickel mold which is formed in Example 1 was performed. The contact angle was measured (n=5) by dropping ion exchange water using prop Master 700 (manufactured by Kyowa Interface Science Co., Ltd.)
(1) Surface Observation A sample coated by immersing a nickel mold in the solution (SA-1) for 5 minutes and a non-coated sample were observed by a AFM method using SPA400 (manufactured by Seiko Instruments Inc.) and thus it was confirmed that a monolayer of one layer was formed.
(2) Confirmation of Coating Contact angles of nickel substrates which were immersed into the solution (SA-1) for 5 minutes, for 3 hours, for 6 hours, and for 16 hours, respectively, and were coated were measured. The results are shown in FIG. 1. As a result, it is confirmed that the water-repellentcy of the samples having from 5 minutes to 16 hours of the coating time were in about equal measure.
(3) Heat Resistance Samples in which nickel substrates were immersed in a solution (SA-4) for 5 minutes, for 3 hours, for 6 hours, and for 16 hours, respectively, and were coated, and a silicone substrate as a positive control which was immersed in a solution (SA-1) for 5 minutes and was coated were heated within from 100 to 400° C. for 10 minutes followed by cooling and the contact angles thereof were measured. The results were shown in FIG. 2. As a result, it was confirmed that it is possible to heat until 200° C. because the contact angle of water was 100° or more when heating within 200° C.
(4) Abrasion Resistance A sample in which a nickel substrate was immersed in a solution (SA-4) for 5 minutes and was coated, a silicone substrate as positive control which was immersed in the solution (SAA) for 5 minutes and was coated, and, as a comparative example, a vapor phase deposited silicon substrate which was obtained by being exposed at 150° C. for 12 hours in atmosphere of n-octadecylmethoxysilane (ODS) (manufactured by Gelest, Inc.) were tested.

After back-and-forth rubbing 100 times, 500 times, 1000 times, respectively, under the condition of a 1.5 kg load, 5 cm of scanning area, and 2 cm×1 cm of cotton ground plane by using Rubbing Tester (manufactured by Taihei Rikagaku Kogyo), an ultrasonic cleaning was performed with toluene for 20 seconds followed by measuring the contact angle. The nickel substrate to which an ultrasonic cleaning has not been performed also was included as a sample.

Figure 3:
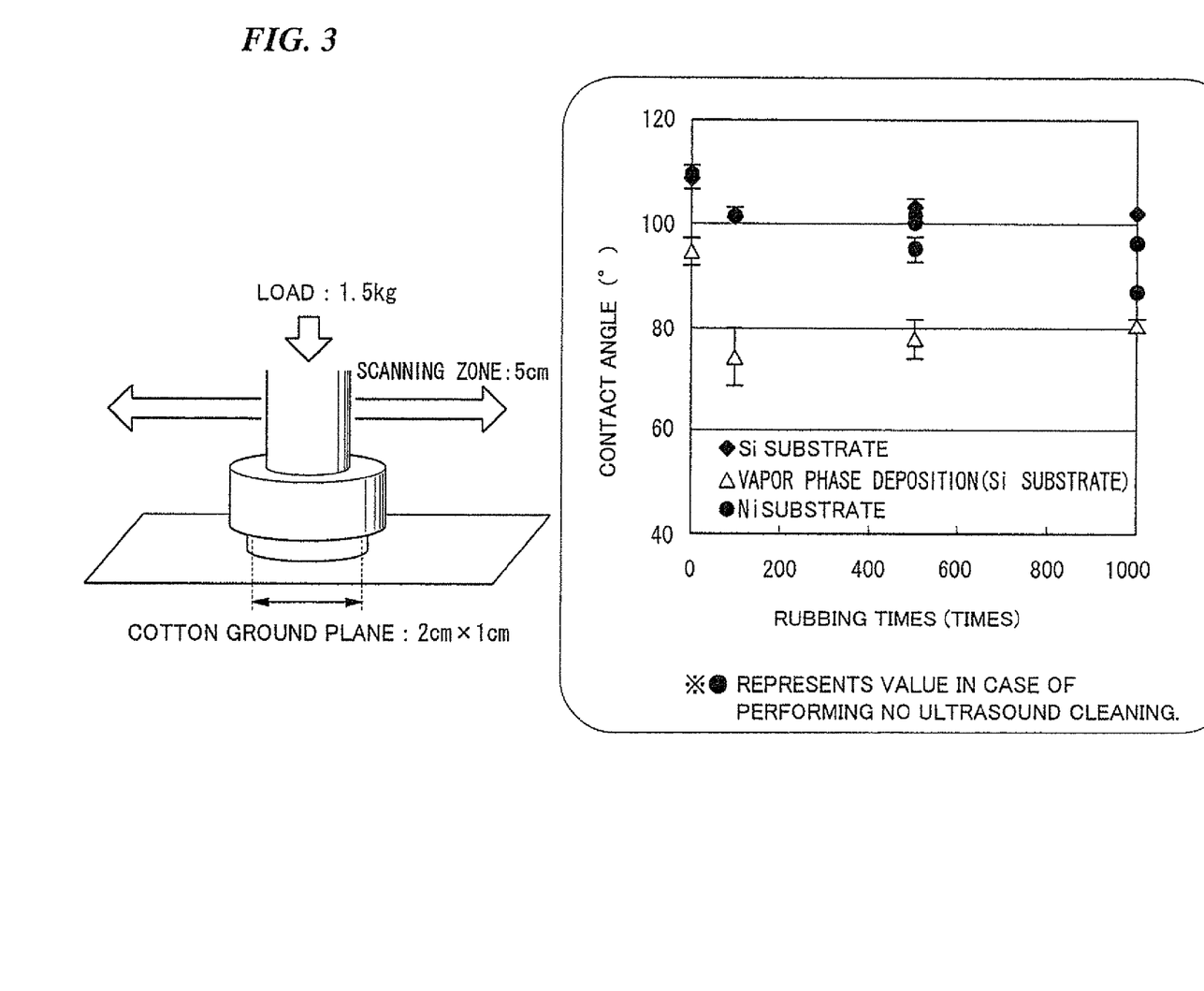
FIG. 3 is an outline of an abrasion resistance test for the surface of the nickel mold on which a release layer of the present invention was formed and a graph showing the result of measuring the contact angle of the surface of the nickel mold and the surface of the silicone substrate after the abrasion resistance test.

The results are shown in FIG. 3. As a result, it was confirmed that the contact angle of water of the samples to which an ultrasonic cleaning was performed maintained 100° or more after back-and-forth rubbing 500 times.
(5) Release Property As the nickel substrate, a mold on the surface of which a fine pattern of μm-order or less has been performed was used. This mold was immersed in a solution (SA-1) for 5 minutes to form a release layer composed of an organic thin film. The fine pattern on the surface of the nickel mold having this release layer was transferred to an acrylic resin and the resin was cured by exposing to ultraviolet rays followed by releasing from the nickel mold to produce an acryl light guide plane for a liquid crystal display panel. As a result, it is confirmed that the release properties of the acryl light guide plane from nickel mold is excellent compared with the release properties when using conventional release agent.

Example 3

(1) Preparation of Catalyst-1

12.4 g of titanium tetraisopropoxide (trade name "A-1" manufactured by Nippon Soda Co., Ltd: 99% purity, 28.2% by weight concentration as titanium oxide) were dissolved in 45.0 g of toluene in a four-necked flask, and after replacing the inside of the flask with nitrogen gas, the solution was cooled to −80° C. in a bath of ethanol/liquid nitrogen. Separate from this procedure, after mixing 1.26 g of ion exchange water (molar ratio of H$_2$O/Ti=1.6) with 11.3 g of isopropanol, the mixture, which cooled to −80 to −70° C., was dropped into the four-neck flask while stirring. During dropping, the liquid temperature inside the flask was maintained at −80 to −70° C. Following completion of dropping, the solution was stirred for 30 minutes while cooling followed by warming to room temperature to obtain a colorless, transparent partially hydrolyzed solution (C-2). The concentration of the solution was 5% by weight as titanium oxide.

(2) Preparation of Catalyst-2

530 g of titanium tetraisopropoxide (trade name "A-1" manufactured by Nippon Soda Co., Ltd: 99% purity, 28.2% by weight concentration as titanium oxide) were dissolved in 1960 g of toluene in a four-necked flask, the inside of which has been replaced with nitrogen gas, and the solution was cooled to −15° C. in a bath of ethanol/dry ice. Separate from this procedure, after mixing 30.4 g of ion exchange water (molar ratio of H$_2$O/Ti=0.9) with 274 g of isopropanol, the mixture was dropped into the four-neck for 90 minutes while stirring. During dropping, the liquid temperature inside the flask was maintained at −15 to −10° C. Following completion of dropping, the solution was stirred for 30 minutes at −10° C. and stirred for 1 hour after warming to room temperature to obtain a colorless, transparent liquid. This liquid was cooled to −80° C. in a bath of ethanol/thy ice and a mixture of 20.3 g of ion exchange water (molar ratio of H$_2$O/Ti=0.6) and 183 g of isopropanol was dropped into the liquid for 90 minutes while stirring. Following completion of dropping, the liquid was warmed to room temperature over 3 hours and refluxed at 90 to 100° C. for 2 hours to obtain a colorless, transparent partially hydrolyzed solution (C-3) having 5% by weight concentration as titanium oxide. This solution was a sol having monodisperse particles with sharp peak distribution, the particles having a 5.6 nm average particle size.

(3) Preparation of Catalyst-3

17.79 g (62.6 mmol) of titanium tetraisopropoxide (trade name "A-1" manufactured by Nippon Soda Co., Ltd: 99% purity, 28.2% by weight concentration as titanium oxide) and 65.31 g of dehydrated toluene were mixed with stirring and dissolved in a flask at a 18° C. liquid temperature under a nitrogen gas atmosphere. The mixture of 1.69 g of water (93.9 mmol, molar ratio of $H_2O/Ti=1.5$), 30.42 g of dehydrated isopropanol, and 30.42 g of dehydrated toluene (the water density is equal to 22% of saturated water solubility to mixed solvent of isopropanol and toluene) was dropped into the flask with stirring at a 18 to 20° C. liquid temperature for 2 hours to obtain a pale yellow, transparent solution. After stirring at a 18° C. liquid temperature for a further 1.5 hours, the yellow of the solution became a little stronger. Then, after refluxing for 2.5 hours, the solution became colorless and transparent. The oxide concentration of the solution was 3.4% by weight. This solution was diluted by adding toluene so as the oxide concentration to become 1.0% by weight to obtain a catalyst (C-4).

(4) Silane Surfactant

As the silane surfactant for preparing a solution for producing an organic thin film, M-1: n-octadecyltrimethoxysilane (ODS) (manufacutured by Gelest, Inc.) was used.

(4) Preparation of Solution for Producing an Organic Thin Film

Ion exchange water was added to dehydrated toluene and strongly stirred to prepare water-containing toluene shown in Table 1. The silane surfactant M-1 was added to this water containing-toluene so that the final density was 0.5% by weight and stirred at room temperature for 30 minutes. Next, the catalysts C-1 to C-3 were dropped into this solution in the predetermined quantities shown in Table 1. After completion of dropping, the solution was stirred at room temperature for 3 hours to obtain solutions (SA-2 to SA-4).

TABLE 1

| Solution for forming an organic thin film | Catalyst C | Mixture ratio between M-1 and C | Moisture content before treatment (PPM) | Moisture content in solution (PPM) |
|---|---|---|---|---|
| SA-2 | C-2 | 95:5 | 1000 | 520 |
| SA-3 | C-3 | 90:10 | 1000 | 485 |
| SA-4 | C-4 | 90:10 | 1000 | 480 |

(6) Formation of Organic Thin Film

Nickel substrates to which an ultrasonic cleaning and ozone cleaning have been performed were immersed in the respective aforementioned solutions (SA-2 to SA-4) followed by pulling up and were dried at 60° C. for 10 minutes after performing an ultrasonic cleaning with toluene for 10 seconds to form organic thin films of M-1 (SAM-2 to SAM-4).

Also, an organic thin film of M-1 (SAM-5) was formed using a solution (SA-2) in same manner with the exception of using a silica glass substrate instead of a nickel substrate. As a result of measuring the contact angle of this organic thin film (SAM-5), the contact angle of water was 108.1° and the contact angle of tetradecane was 37.2°.

(7) Releasing Properties and Abrasion Resistance

The release properties and abrasion resistance of the organic thin films of M-1 (SAM-2 to SAM-4, SAM-5) is excellent similar to that of the release film formed in Example 1

What is claimed is:

1. A method for producing a forming mold or electroforming mother die comprising:
forming a release layer composed of an organic thin film on a mold surface or mother die surface by contacting the mold or mother die with an organic solvent solution comprising:
(i) a silane surfactant represented by formula [1]

$$R_n-Si-X_{4-n} \quad [1]$$

wherein:
R is selected from the group consisting of an optionally substituted hydrocarbon group having 1 to 20 carbon atoms, an optionally substituted halogenated hydrocarbon group having 1 to 20 carbon atoms, a hydrocarbon group having a linking group which has 1 to 20 carbon atoms, and a halogenated hydrocarbon group having a linking group which has 1 to 20 carbon atoms;
X is selected from the group consisting of a hydroxyl group, a halogen atom, an alkoxy group having 1 to 6 carbon atoms, and an acyloxy group; and
n represents an integer of 1 to 3, and
(ii) a catalyst capable of interacting with the silane surfactant;
wherein a moisture content of the organic solvent solution is set or maintained within a range of from 50 ppm to a saturated moisture content of the organic solvent.

2. The method for producing a forming mold or electroforming mother die according to claim 1, wherein the forming mold is a forming mold for molding resin.

3. The method for producing a forming mold or electroforming mother die according to claim 1, wherein the silane surfactant represented by formula [1] is n-octadecyltrimethoxysilane.

4. The method for producing a forming mold or electroforming mother die according to claim 1, wherein the catalyst capable of interacting with the silane surfactant is at least one compound selected from the group consisting of metal oxides, metal hydroxides, metal alkoxides, metal compounds chelated or coordinated, partial hydrolysis products of metal alkoxide, hydrolysis products obtained by treating a metal alkoxide with water in an amount 2 times or more the equivalent of the metal alkoxide, organic acids, silanol condensation catalysts, and acid catalysts.

5. The method for producing a forming mold or electroforming mother die according to claim 1, wherein the catalyst capable of interacting with the silane surfactant is a composition comprising:
(a) at least one compound selected from the group consisting of metal oxides, metal hydroxides, metal alkoxides, metal compounds chelated or coordinated, partial hydrolysis products of metal alkoxide, hydrolysis products obtained by treating a metal alkoxide with water in an amount 2 times or more the equivalent of the metal alkoxide, organic acids, silanol condensation catalysts, and acid catalysts; and
(b) the silane surfactant.

6. The method for producing a forming mold or electroforming mother die according to claim 4, wherein the metal alkoxide is titanium alkoxide.

7. The method for producing a forming mold or electroforming mother die according to claim 5, wherein the metal alkoxide is titanium alkoxide.

8. The method for producing a forming mold or electroforming mother die according to claim 1, wherein the mold or mother die is made of nickel, stainless, or glass.

9. The method for producing a forming mold or electroforming mother die according to claim 2, wherein the forming mold is a forming mold for molding an acrylic resin.

10. The method for producing a forming mold or electroforming mother die according to claim 1, wherein the mold or mother die is contacted with the organic solvent solution by immersing the mold or mother die in the organic solvent solution.

11. The method for producing a forming mold or electroforming mother die according to claim 1, wherein a fine pattern of μm-order or less is preformed on the mold surface or mother die surface.

* * * * *